US011053706B2

(12) United States Patent
Knapp et al.

(10) Patent No.: US 11,053,706 B2
(45) Date of Patent: Jul. 6, 2021

(54) DOUBLE CANOPY COVERED WAGON

(71) Applicant: Conestoga Wagon Co. LLC, Jackson, WY (US)

(72) Inventors: Michael Knapp, Bloomington, ID (US); Jason Olson, St. Charles, ID (US); Richard Smart, Bloomington, ID (US)

( * ) Notice: Subject to any disclaimer, the term of this patent is extended or adjusted under 35 U.S.C. 154(b) by 0 days.

(21) Appl. No.: 17/001,481

(22) Filed: Aug. 24, 2020

(65) Prior Publication Data

US 2021/0054648 A1 Feb. 25, 2021

Related U.S. Application Data

(60) Provisional application No. 62/891,295, filed on Aug. 24, 2019.

(51) Int. Cl.
| | |
|---|---|
| *B60P 3/34* | (2006.01) |
| *B60P 3/38* | (2006.01) |
| *E04H 15/06* | (2006.01) |
| *E04H 15/34* | (2006.01) |
| *B60H 1/32* | (2006.01) |
| *B62D 63/06* | (2006.01) |
| *B61D 27/00* | (2006.01) |
| *B62C 1/00* | (2006.01) |
| *E04H 15/64* | (2006.01) |

(52) U.S. Cl.
CPC ............... *E04H 15/06* (2013.01); *B60H 1/32* (2013.01); *B60H 1/3226* (2013.01); *B60P 3/341* (2013.01); *B60P 3/38* (2013.01); *B61D 27/0072* (2013.01); *B62C 1/00* (2013.01); *B62D 63/06* (2013.01); *E04H 15/34* (2013.01); *B62D 63/068* (2013.01); *E04H 15/64* (2013.01)

(58) Field of Classification Search
CPC ...................................................... B60P 3/341
USPC ........................................................ 296/104
See application file for complete search history.

(56) References Cited

U.S. PATENT DOCUMENTS

| | | | | | |
|---|---|---|---|---|---|
| 26,547 | A | * | 12/1859 | Dikeman | ................. B60J 7/102 |
| | | | | | 296/104 |
| 353,365 | A | * | 11/1886 | McLaughlin | .......... B60J 1/2011 |
| | | | | | 296/140 |
| 355,231 | A | * | 12/1886 | Tomkins | ................. B60P 3/341 |
| | | | | | 296/161 |
| 859,815 | A | * | 7/1907 | Kelley | ..................... B60J 7/102 |
| | | | | | 296/104 |
| 1,280,841 | A | * | 10/1918 | Reid | ....................... B60P 3/341 |
| | | | | | 296/169 |

(Continued)

*Primary Examiner* — Noah Chandler Hawk
(74) *Attorney, Agent, or Firm* — Seth Black; Black IP, PLLC

(57) ABSTRACT

The present invention extends to a double canopy covered wagon. Interior canopy frame supports support an interior canopy over a portion of a wagon flooring surface and under larger exterior canopy frame supports. The exterior canopy frame supports support an exterior canopy over the interior canopy. Including interior and exteriors canopies increases insulation relative to a single canopy. Further, since the exterior canopy frame supports are larger than the interior canopy frame supports, air can flow between the interior and exterior canopies. Air flow between the canopies in combination with increased insulation facilitates more effective climate control inside a wagon.

12 Claims, 11 Drawing Sheets

(56) References Cited

U.S. PATENT DOCUMENTS

| | | | | |
|---|---|---|---|---|
| 1,564,257 | A | * | 12/1925 | Lippman ................. B60P 3/341 296/169 |
| 2,942,914 | A | * | 6/1960 | Noot ....................... B62B 3/007 296/102 |
| 6,454,340 | B1 | * | 9/2002 | Miller ...................... B60J 7/10 135/136 |
| 7,273,245 | B2 | * | 9/2007 | Ray ......................... B60P 3/341 296/105 |
| 8,444,174 | B1 | * | 5/2013 | Miller, Jr. ............. B62D 63/062 280/656 |
| 2011/0278877 | A1 | * | 11/2011 | Kim ........................ B60P 3/341 296/168 |

* cited by examiner

DOUBLE CANOPY COVERED WAGON

CROSS-REFERENCE TO RELATED APPLICATIONS

This application claims the benefit of U.S. Provisional Patent Application Ser. No. 62/891,295, entitled "Covered Wagon Double Canopy", filed Aug. 24, 2019, which is incorporated herein in its entirety.

BACKGROUND

Background and Relevant Art

Outdoor recreational activities including hiking, fishing, swimming, biking, etc. are enjoyed by many. Participants often desire to stay outdoors (possibly while on vacation) at or near locations where such recreational activities can occur. Others desire to stay outdoors simply to get away from things. Outdoor accommodations can include tents, cabins, wagons, yurts, etc.

Although many enjoy the outdoors, there can be a high degree of variability between individuals with respect to desired lodging amenities. Some individuals may desire few amenities, for example, "roughing it" in a tent away from any infrastructure (e.g., away from electricity, running water, sewer, Internet connectivity, climate control, etc.). Other individuals may desire lodging that includes various amenities, including one or more forms of infrastructure. When a number of lodging amenities are provided, the activity may be referred to as "glamping".

BRIEF SUMMARY

Examples extend to double canopy covered wagons. A wagon includes a chassis. One or more axles are attached to one side (e.g., the underside) of the chassis and each axle includes one or more attached wheels. A flooring surface is attached to another side (e.g., the upper side) of the chassis. A first side surface is attached at or near a longitudinal edge of the flooring surface. A second side surface is attached at or near another and opposing longitudinal edge of the flooring surface.

A plurality of (e.g., exterior) canopy frame supports (e.g., arches or bows) are attached to the first side surface and the second side surface and span between the first side surface and second side surface. Another plurality of (e.g., interior) canopy frame supports (e.g., also arches or bows) are also attached to the first side surface and the second side surface and span between the first side surface and second side surface. Canopy frame supports included in the plurality of (e.g., exterior) canopy frame supports can be larger than canopy frame supports included in the other plurality of (e.g., interior) frame supports.

An exterior canopy can rest on the plurality of (e.g., exterior) canopy frame supports, span between the plurality of canopy frame supports, and span between the first side surface and the second side surface. An interior canopy can rest on the other plurality of (e.g., interior) canopy frame supports, span between the other plurality of canopy frame supports, and span between the first side surface and the second side surface. Including interior and exterior canopies increases insulation relative to a single canopy. Further, since the plurality of (e.g., exterior) canopy frame supports are larger than the other plurality of (e.g., interior) canopy frame supports, air can flow between the interior and exterior canopies. Air flow between the canopies in combination with increased insulation facilitates more effective climate control inside a wagon.

In one aspect, exterior canopy frame supports and interior canopy frame supports are included in at least partially overlapping pairs. Since exterior canopy frame supports are larger, there can be a gap between the exterior canopy frame support and the interior canopy frame support of a pair. In another aspect, exterior canopy frame supports and interior canopy frame supports are offset from one another. For example, exterior canopy frame supports and interior canopy frame supports can alternate along the first and second side surfaces.

The first and second side surfaces can include corresponding frame support sleeves. Canopy frame supports can be inserted into the frame support sleeves. In one aspect, exterior canopy frame support sleeves are attached to the exterior of the first and second side surfaces and interior canopy frame support sleeves are attached to the interior of the first and second side surfaces. However, exterior canopy frame support sleeves may be attached to the interior of the first and second side surfaces. Likewise, interior canopy frame support sleeves may be attached to the exterior the first and second side surfaces.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1A:
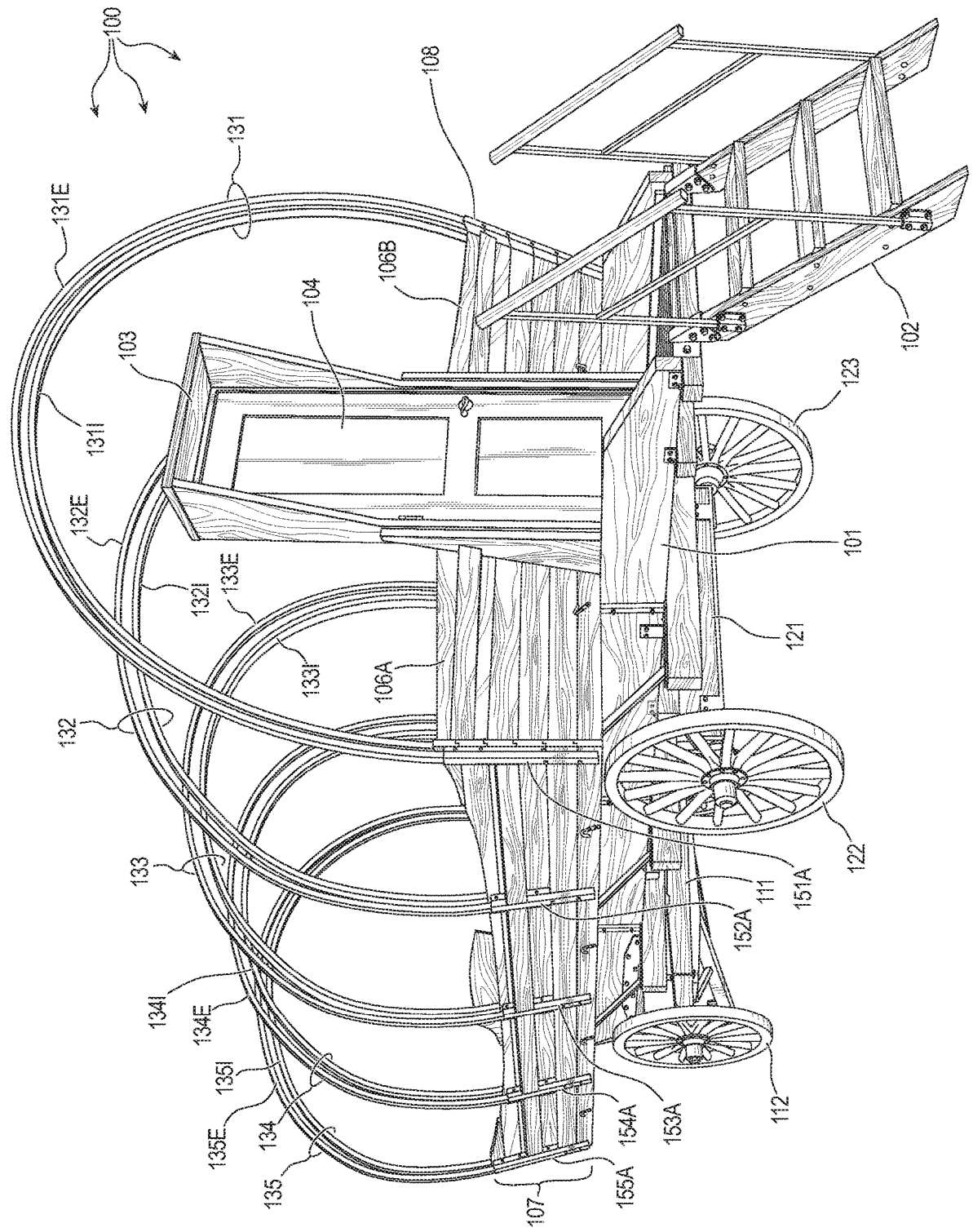
FIG. 1A illustrates an example view of an end of a wagon.

Examples extend to double canopy covered wagons.

Many individuals desire to stay in the outdoors, even in relatively remote areas, while still enjoying various amenities, such as, as electricity, plumbing, climate control, Internet access, etc. Such stays may be referred to as "glamping". Glamping can include staying in less improved, possibly temporary and/or mobile structures, such as, tents, yurts, wagons, etc. Providing climate control in less improved, temporary and/or mobile structures can be difficult. These structures are often constructed of single layers of fabric (providing limited insulation) and lack internal air circulation mechanisms.

A wagon can include a chassis. In one aspect, the chassis includes first and second longitudinal joists and a plurality of cross beams running between the first and second longitudinal joists. An area between the first and second longitudinal joists can be utilized as a utility channel. Wires, pipes, conduits, etc. can be run through the utility channel to different parts of the wagon.

One or more axles are attached to one side (e.g., the underside) of the chassis and each axle includes one or more attached wheels.

A flooring surface is attached to another side (e.g., the upper side) of the chassis. The flooring surface can be constructed from a plurality of planks and/or other pieces of material. The planks and/or other pieces of material can include wood, metal, plastic, composite materials, etc.

A first side surface is attached at or near a longitudinal edge of the flooring surface. A second side surface is attached at or near another and opposing longitudinal edge of the flooring surface. The first and second side surfaces can be constructed from a plurality of planks and/or other pieces of material. The planks and/or other pieces of material can include wood, metal, plastic, composite materials, etc. The first and second side surfaces can be constructed of the same materials used to construct the flooring surface or can be constructed of different materials.

A plurality of (e.g., exterior) canopy frame supports (e.g., arches or bows) are attached to the first side surface and the second side surface and span between the first side surface and second side surface. Another plurality of (e.g., interior) canopy frame supports (e.g., also arches or bows) are also attached to the first side surface and the second side surface and span between the first side surface and second side surface. Canopy frame supports included in the plurality of (e.g., exterior) canopy frame supports can be larger than canopy frame supports included in the other plurality of (e.g., interior) frame supports. In one aspect, canopy frame supports are constructed from metal.

An exterior canopy can rest on the plurality of (e.g., exterior) canopy frame supports, span between the plurality of canopy frame supports, and span between the first side surface and the second side surface. An interior canopy can rest on the other plurality of (e.g., interior) canopy frame supports, span between the other plurality of canopy frame supports, and span between the first side surface and the second side surface. In one aspect, canopies are constructed from canvas. Canvas used for canopies can be designed for and/or treated to provide mold resistance or other properties that improve usability, reduce maintenance, or increase durability.

Including interior and exterior canopies increases insulation relative to a single canopy. Further, since the plurality of (e.g., exterior) canopy frame supports are larger than the other plurality of (e.g., interior) canopy frame supports, air can flow between the interior and exterior canopies. Air flow between the canopies in combination with increased insulation facilitates more effective climate control inside a wagon.

In one aspect, exterior canopy frame supports and interior canopy frame supports are included in at least partially overlapping pairs. Since exterior canopy frame supports are larger, there can be a gap between the exterior canopy frame support and the interior canopy frame support of a pair. In another aspect, exterior canopy frame supports and interior canopy frame supports are offset from one another. For example, exterior canopy frame supports and interior canopy frame supports can alternate along the first and second side surfaces.

The first and second side surfaces can include corresponding frame support sleeves. Canopy frame supports can be inserted into the frame support sleeves. In one aspect, exterior canopy frame support sleeves are attached to the exterior of the first and second side surfaces and interior canopy frame support sleeves are attached to the interior of the first and second side surfaces. However, exterior canopy frame support sleeves may be attached to the interior of the first and second side surfaces. Likewise, interior canopy frame support sleeves may be attached to the exterior of the first and second side surfaces. In one aspect, canopy frame support sleeves are constructed from metal. Canopy frame support sleeves can be tailored for receiving canopy frame supports such that the sleeves can accept a canopy frame support and the canopy frame support is secure after insertion (e.g., due to friction, tension on the canopy frame support, mechanical attachment such as screws, bolts, etc.).

FIG. 1A illustrates an example view of an end of a wagon 100. As depicted, wagon 100 includes chassis 101. Chassis 101 includes two longitudinal joists and a plurality of cross beams running between the first and second longitudinal joists. An area between the two longitudinal joists can be utilized as a utility channel. Wires, pipes, conduits, etc. can be run through the utility channel to different parts of wagon 100.

Axles 111 and 121 are attached to the underside of chassis 101. Axle 111 includes wheels 112 and 113. Axle 121 includes wheels 122 and 123. Wheels 112, 113, 122, and 123 can be constructed of wood, metal, plastic, composite materials, etc. In one aspect, wheels 112, 113, 122, and 123 are constructed of wood and a metal (e.g., iron) tire is attached to each wheel.

A flooring surface (not visible) is attached to the upper side of chassis 101. The flooring surface can be constructed from a plurality of planks and/or other pieces of material. The planks and/or other pieces of material can include wood, metal, plastic, composite materials, etc.

Side surfaces 107 and 108 can be attached at or near longitudinal edges of the flooring surface. Each of side surfaces 107 and 108 can be constructed from a plurality of planks and/or other pieces of material. The planks and/or other pieces of material can include wood, metal, plastic, composite materials, etc. Side surfaces 107 and 108 can be constructed of the same materials used to construct the flooring surface or can be constructed of different materials.

Rear surfaces 106A and 106B are attached at or near a rear edge of the flooring surface. Each of rear surfaces 106A and 106B can be constructed from a plurality of planks and/or other pieces of material. The planks and/or other pieces of material can include wood, metal, plastic, composite materials, etc. Rear surfaces 106A and 106B can be constructed of the same materials used to construct the flooring surface or can be constructed of different materials.

Door frame 103 can be attached to the flooring surface inline with rear surfaces 106A and 106B. An exterior flooring surface (e.g., separate from the flooring surface) can extend towards the rear past door frame 103 to form a patio. Door frame 103 can be constructed of wood, metal, plastic, composite materials, etc. Door frame 103 can house door 104. Door 104 can be used as an entrance to and exit from the interior of wagon 100. Door 104 can be constructed of wood, metal, plastic, composite materials, etc.

Staircase 102 can be attached to rear edge of the patio. Staircase 102 can be constructed of wood, metal, plastic, composite materials, etc. In another aspect without a patio, staircase 102 can be attached at or near rear surfaces 106A and 106B.

Figure 1B:
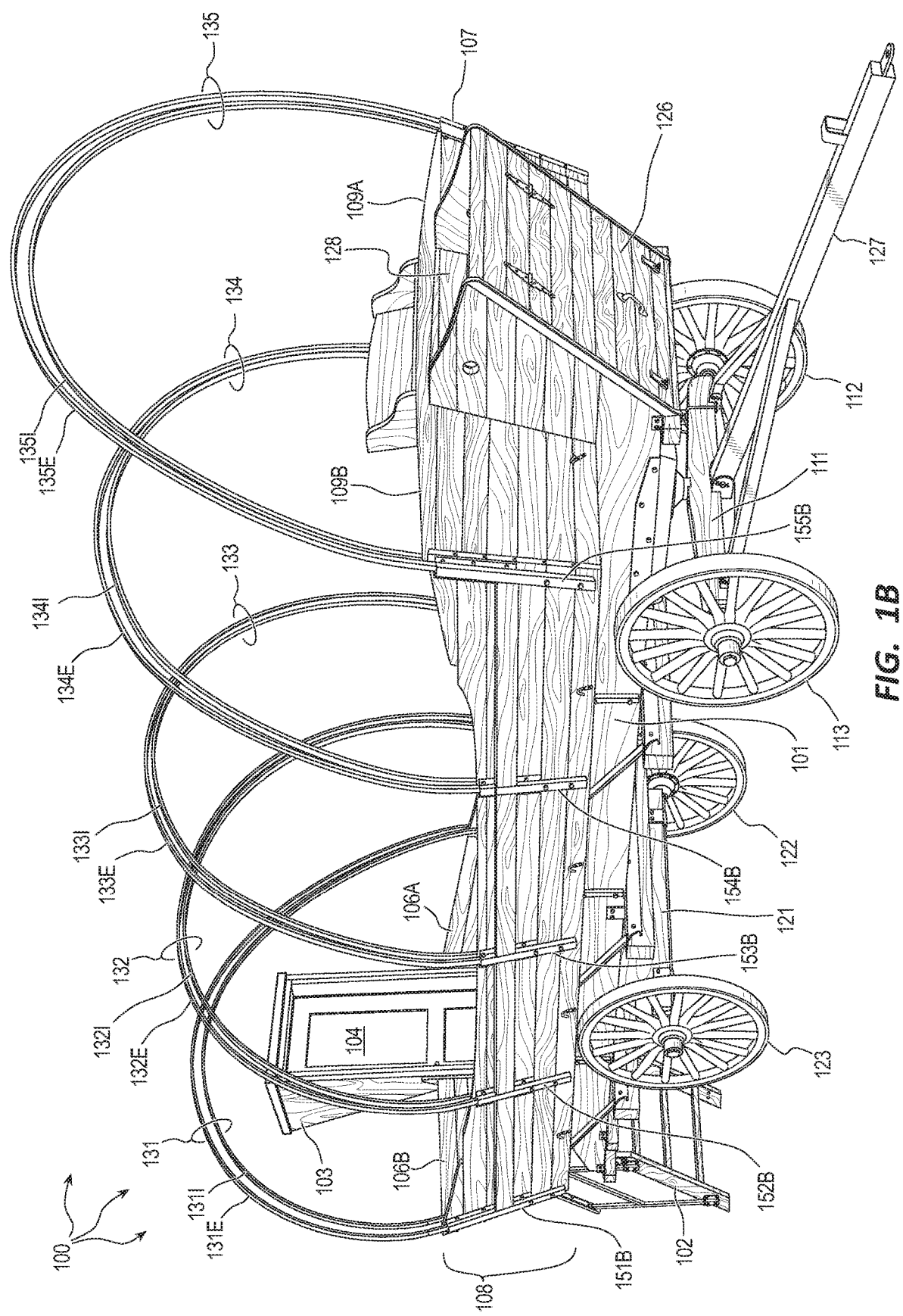
FIG. 1B illustrates an example view of another end of the wagon of FIG. 1A.

Sleeves 151A, 152A, 153A, 154A, and 155A can be attached to side surface 107. FIG. 1B illustrates an example view of another end of wagon 100. As depicted in FIG. 1B, sleeves 151B, 152B, 153B, 154B, and 155B can be attached to side surface 108. Canopy frame support pairs 131, 132, 133, 134, and 135 can span between side surfaces 107 and 108.

Each canopy frame support pair can include an exterior canopy frame support and an interior canopy frame support. Canopy support pair 131 includes exterior canopy frame support 131E and interior canopy frame support 131I. Canopy support pair 132 includes exterior canopy frame support 132E and interior canopy frame support 132I. Canopy support pair 133 includes exterior canopy frame support 133E and interior canopy frame support 133I. Canopy support pair 134 includes exterior canopy frame support 134E and interior canopy frame support 134I. Canopy support pair 135 includes exterior canopy frame support 135E and interior canopy frame support 135I.

Canopy frame support pairs can include pairs of arched or bowed canopy frame supports. Interior canopy frame supports can be arched or bowed canopy frame supports. Similarly, exterior canopy frame supports can be arched or bowed canopy frame supports.

One end of each canopy frame support can be inserted into a sleeve attached to side surface 107 and the other end of each canopy frame support can be inserted into a sleeve attached to side surface 108. In one aspect, each of sleeves 151A, 152A, 153A, 154A, 155A, 151B, 152B, 153B, 154B, and 155B includes a sleeve pair (and thus there are twenty sleeves on wagon 100). In that aspect, each sleeve pair can include a sleeve positioned on the exterior of a side surface and a sleeve positioned on the interior of the side surface.

Per canopy support pair, one end of the exterior canopy frame support can be inserted into a sleeve on the exterior of one side surface and another end of the exterior canopy frame support can be inserted into another sleeve on the exterior of another side surface. Similarly, per canopy support pair, one end of the interior canopy frame support can be inserted into a sleeve on the interior of one side surface and another end of the interior canopy frame support can be inserted into another sleeve on the interior of another side surface. For example, one end of exterior canopy frame support 131E can be inserted into a sleeve 151A on the exterior of side surface 107 and another end of exterior canopy frame support 131E can be inserted into a sleeve 151B on the exterior of side surface 108. Similarly, one end of interior canopy frame support 131I can be inserted into a sleeve 151A on the interior of side surface 107 and another end of interior canopy frame support 131I can be inserted into a sleeve 151B on the interior of side surface 108. Likewise, one end of exterior canopy frame support 132E can be inserted into a sleeve 152A on the exterior of side surface 107 and another end of exterior canopy frame support 132E can be inserted into a sleeve 152B on the exterior of side surface 108. Similarly, one end of interior canopy frame support 132I can be inserted into a sleeve 152A on the interior of side surface 107 and another end of interior canopy frame support 132I can be inserted into a sleeve 152B on the interior of side surface 108. Canopy frame supports 133E and 133I, 134E and 134I, and 135E and 135I can be similarly inserted in sleeves 153A and 153B, sleeves 154A and 154B, and sleeves 155A and 155B respectively.

However, other arrangements of sleeves are also possible. For example, each sleeve pair can include two sleeves positioned on the exterior of a side surface or can include two sleeves on the interior of the side surface.

Sleeves can be constructed of metal, plastic, composite materials, etc.

As depicted in FIGS. 1A and 1B, exterior canopy frame supports are larger than interior canopy frame supports. Due to the difference in size, there is a gap between the exterior canopy frame support and the interior canopy frame support in each canopy frame pair. The difference in size between an exterior canopy frame support and a corresponding interior canopy frame support can increase towards the top of the canopy frame pair. As such, a gap between an exterior canopy frame support and an interior canopy frame support can also increase towards the top of a canopy frame support pair.

As depicted in FIG. 1B, wagon 100 also includes front surfaces 109A and 109B, jockey box 126, hitch 127, and bench 128.

Front surfaces 109A and 109B are attached at or near a front edge of the flooring surface. Each of front surfaces 109A and 109B can be constructed from a plurality of planks and/or other pieces of material. The planks and/or other pieces of material can include wood, metal, plastic, composite materials, etc. Front surfaces 109A and 109B can be constructed of the same materials used to construct the flooring surface or can be constructed of different materials.

When opened, jockey box 126 can provide access to the utility channel between the two longitudinal joists of chassis 101.

Hitch 127 can be used to connect wagon 100 to a tow vehicle, such as, a truck or tractor.

Figure 1C:
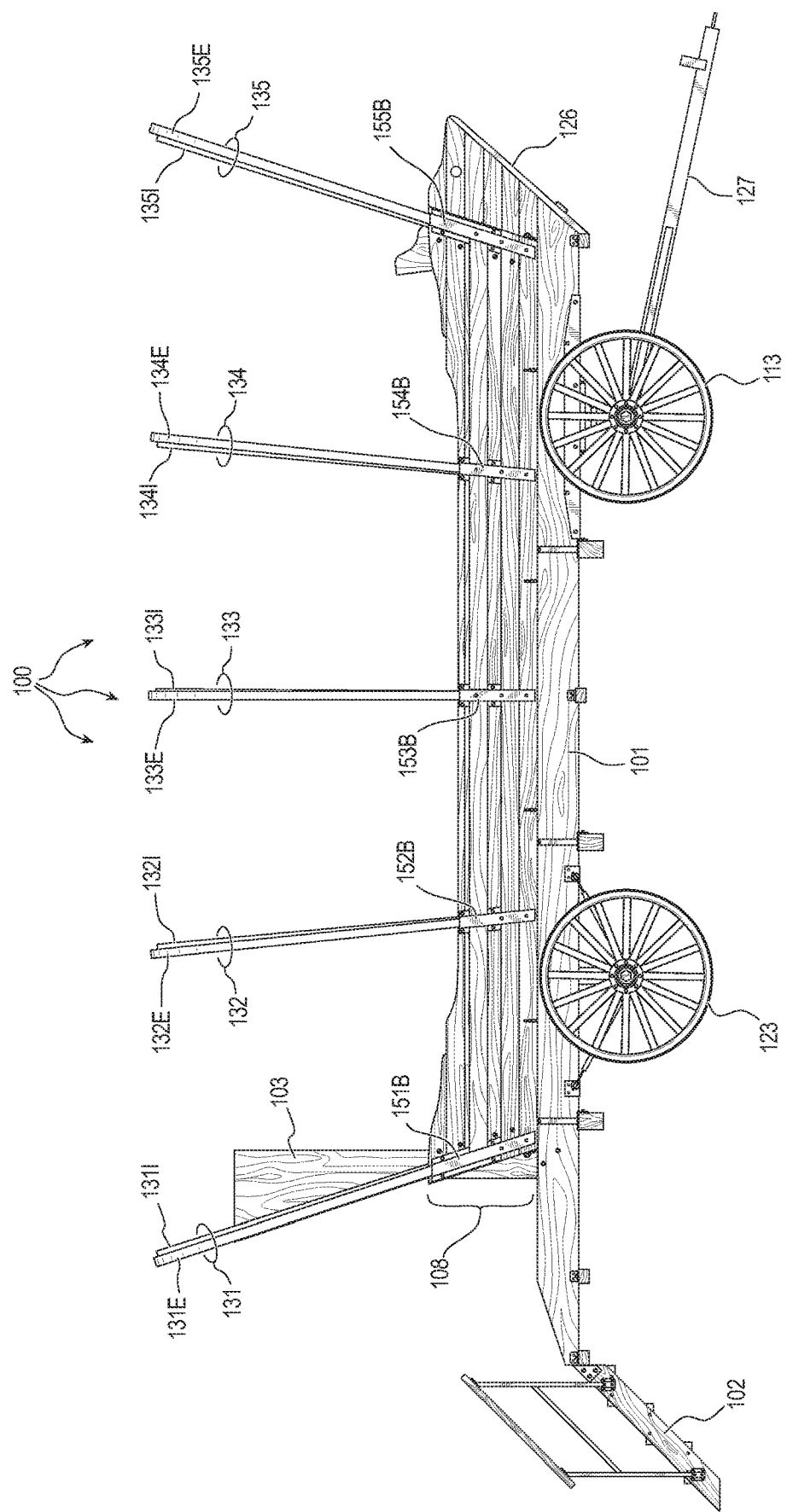
FIG. 1C illustrates a side view of the wagon of FIG. 1A.

FIG. 1C illustrates a side view of wagon 100. As depicted in FIG. 1C, the exterior canopy frame supports, the interior canopy frame supports, and the corresponding sleeves are at least partially, if not substantially, aligned with one another.

Figure 1D:
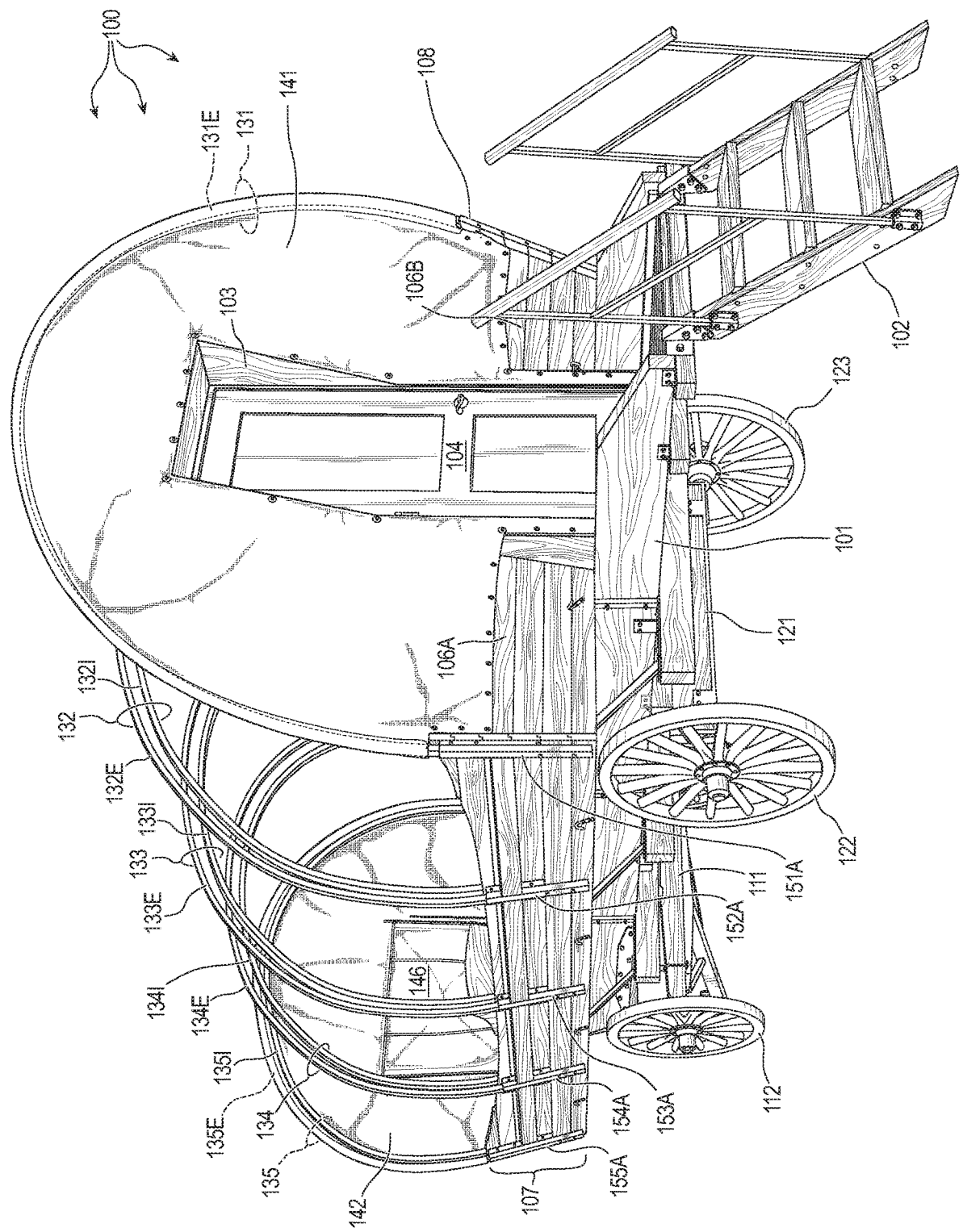
FIG. 1D illustrates an example view of the end of the wagon of FIG. 1A including end canopies.
Figure 1E:
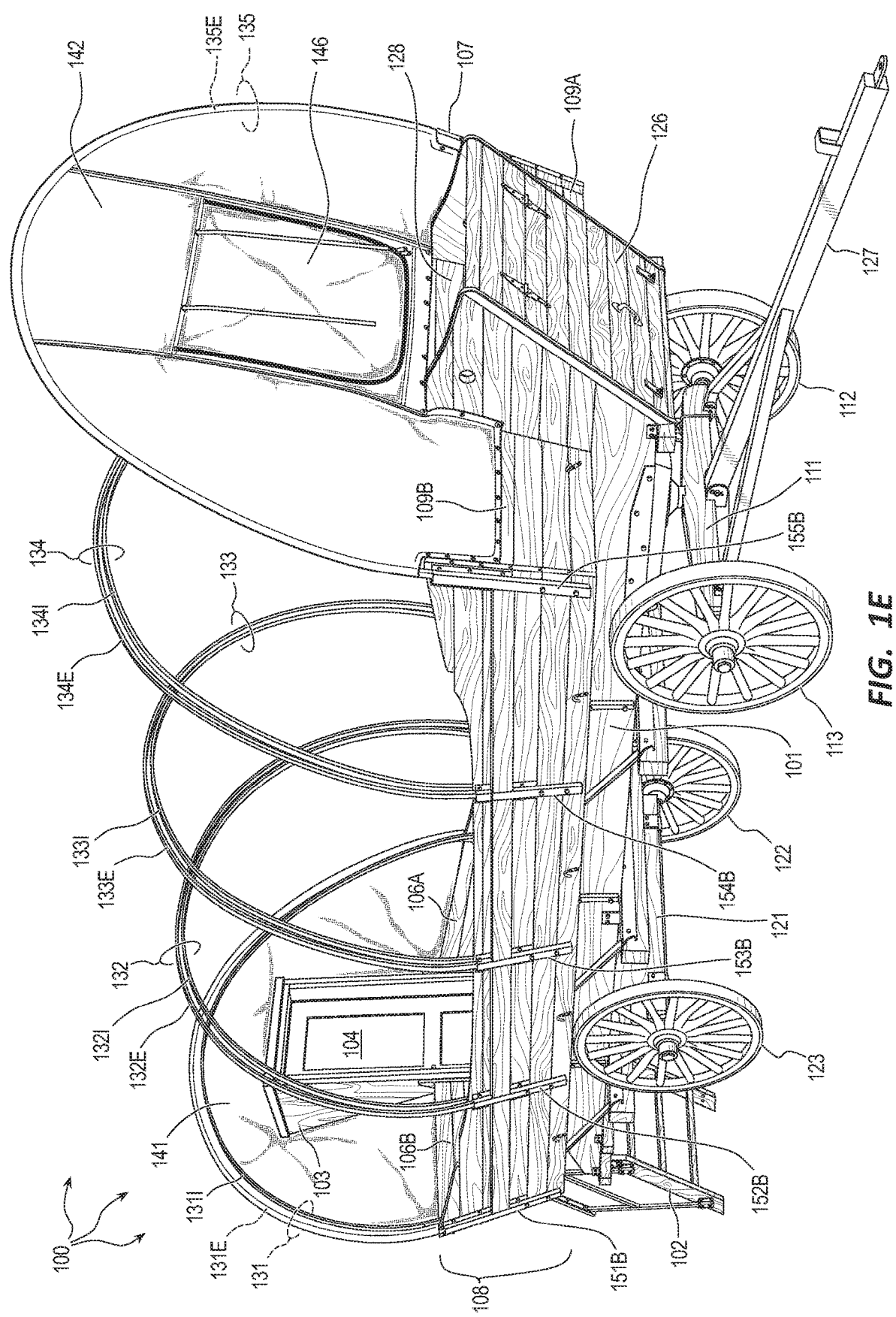
FIG. 1E illustrates an example view of the other end of the wagon of FIG. 1B including end canopies.

FIGS. 1D and 1E illustrate example views of ends of the wagon 100 including end canopies. As depicted in FIG. 1D, exterior canopy frame support 131E is threaded through rear canopy 141 and rear canopy 141 is attached to rear surfaces 106A and 106B and door frame 103. Similarly, as depicted in FIG. 1E, exterior canopy frame support 135E is threaded through front canopy 142 and front canopy 142 is attached to front surfaces 109A and 109B. Front canopy 142 also includes window 146. Front canopy 142 and rear canopy 141 can be constructed of canvas. Canvas used to construct front canopy 142 and rear canopy 141 can be designed for and/or treated to provide mold resistance or other properties that improve usability, reduce maintenance, or increase durability.

Figure 1F:
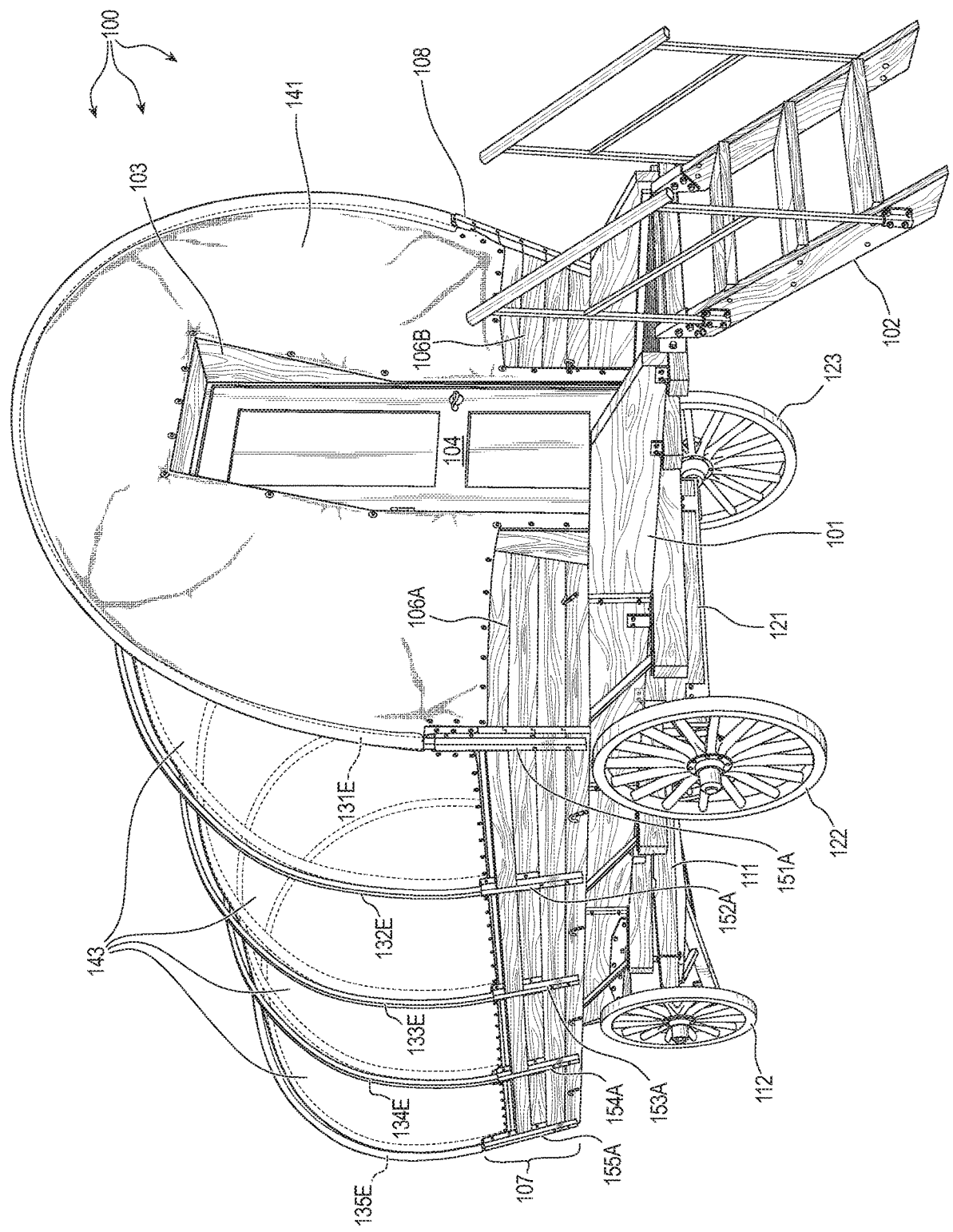
FIG. 1F illustrates an example view of the end of the wagon of FIG. 1D including an interior canopy.
Figure 1G:
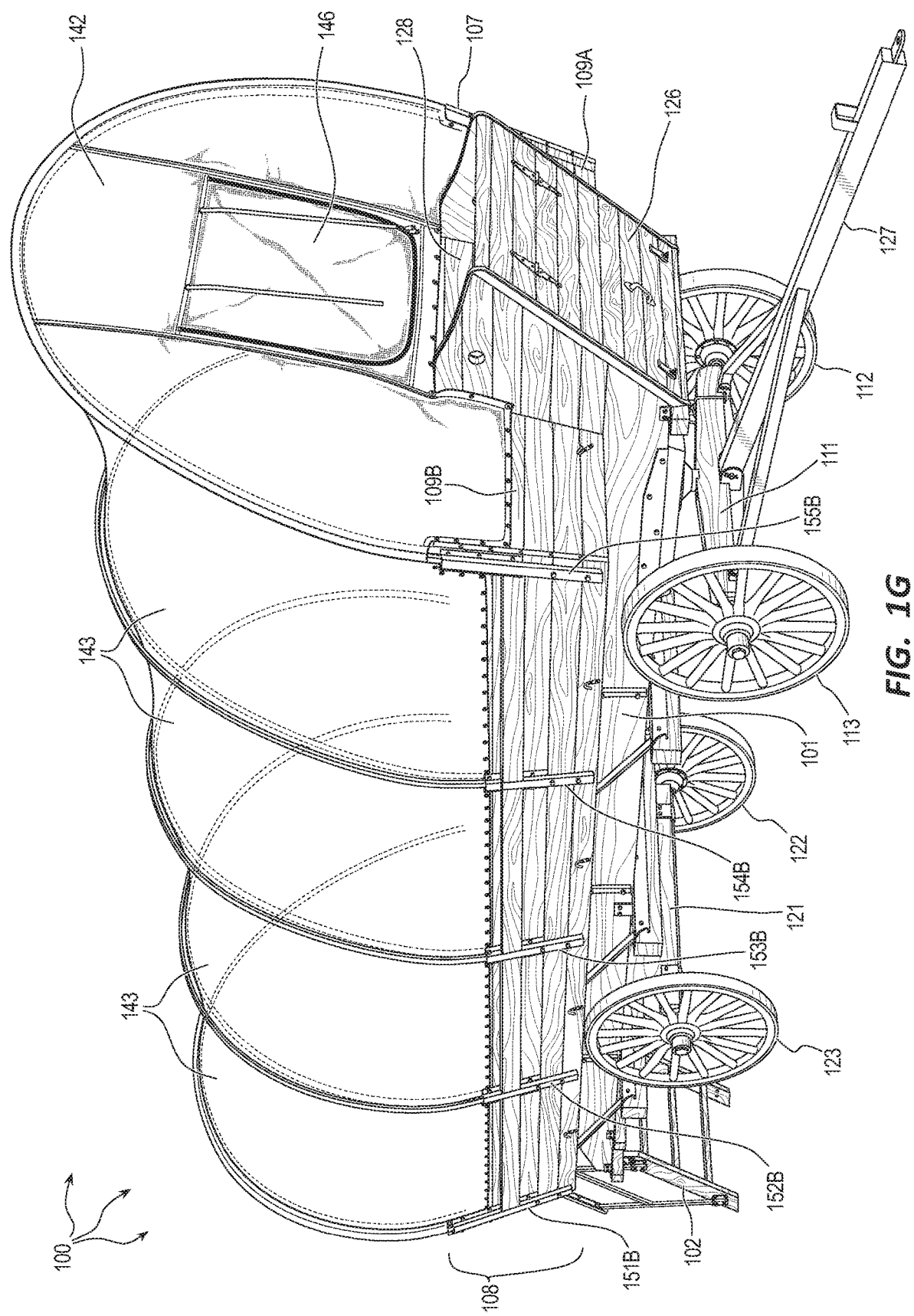
FIG. 1G illustrates an example view of the end of the wagon of FIG. 1E including an interior canopy.

FIGS. 1F and 1G illustrate example views of ends of wagon 100 including an interior canopy. As depicted, interior canopy 143 is placed over interior canopy frame supports 131I, 132I, 133I, 134I, and 135I (and under exterior canopy frame supports 131E, 132E, 133E, 134E, and 135E). Interior canopy 143 spans between interior canopy frame supports 131I, 132I, 133I, 134I, and 135I and spans between side surface 107 and side surface 108. Thus, interior canopy 143 essentially creates a cabin area between: (1) side surface 107, (2) side surface 108, (3) rear surfaces 106A, 106B, and door frame 103, and (4) front surfaces 106A and 106B. Interior canopy 143 can be constructed of canvas. Canvas used to construct interior canopy 143 can be designed for and/or treated to provide mold resistance or other properties that improve usability, reduce maintenance, or increase durability.

Figure 1H:
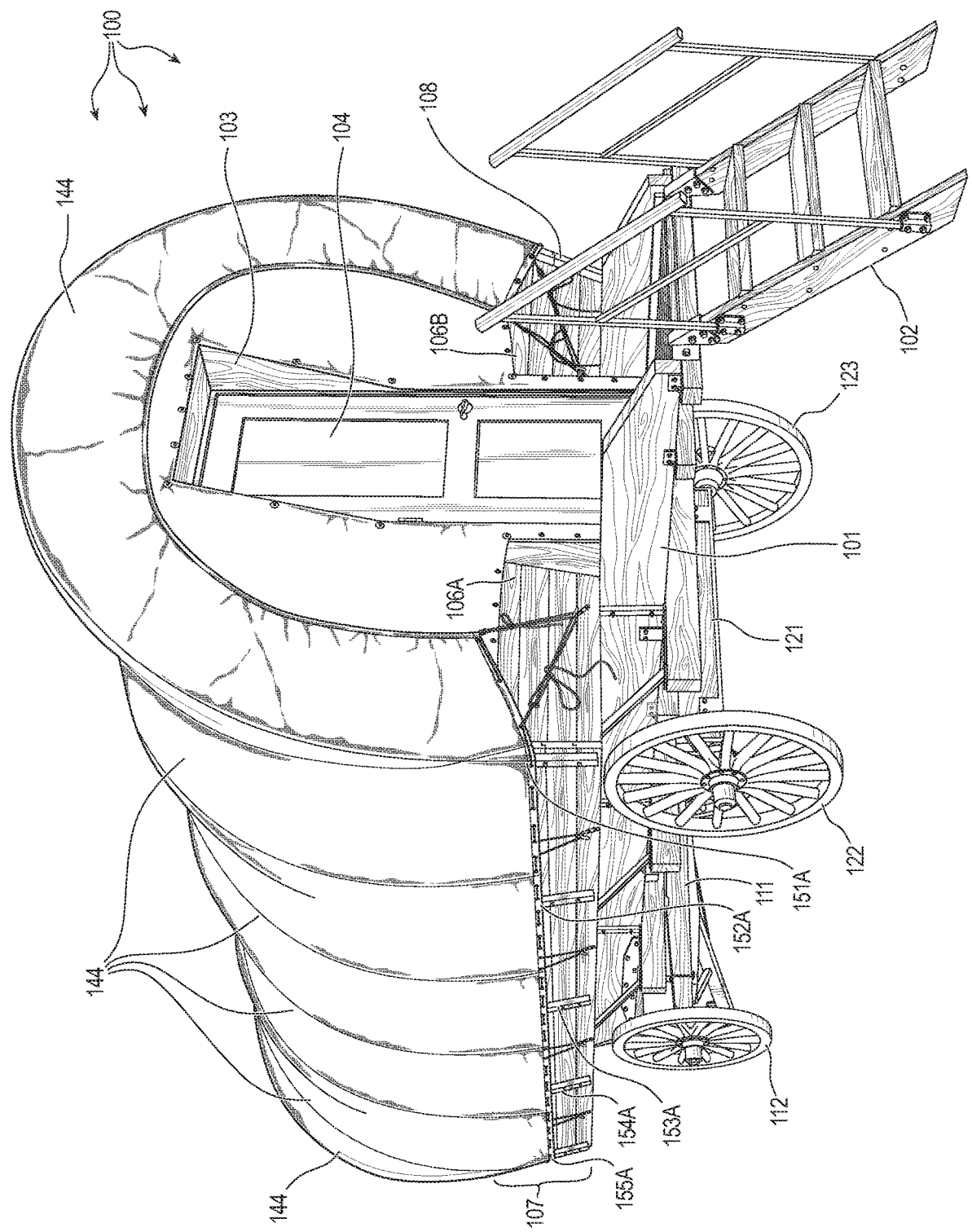
FIG. 1H illustrates an example view of the end of the wagon of FIG. 1F including an exterior canopy.
Figure 1I:
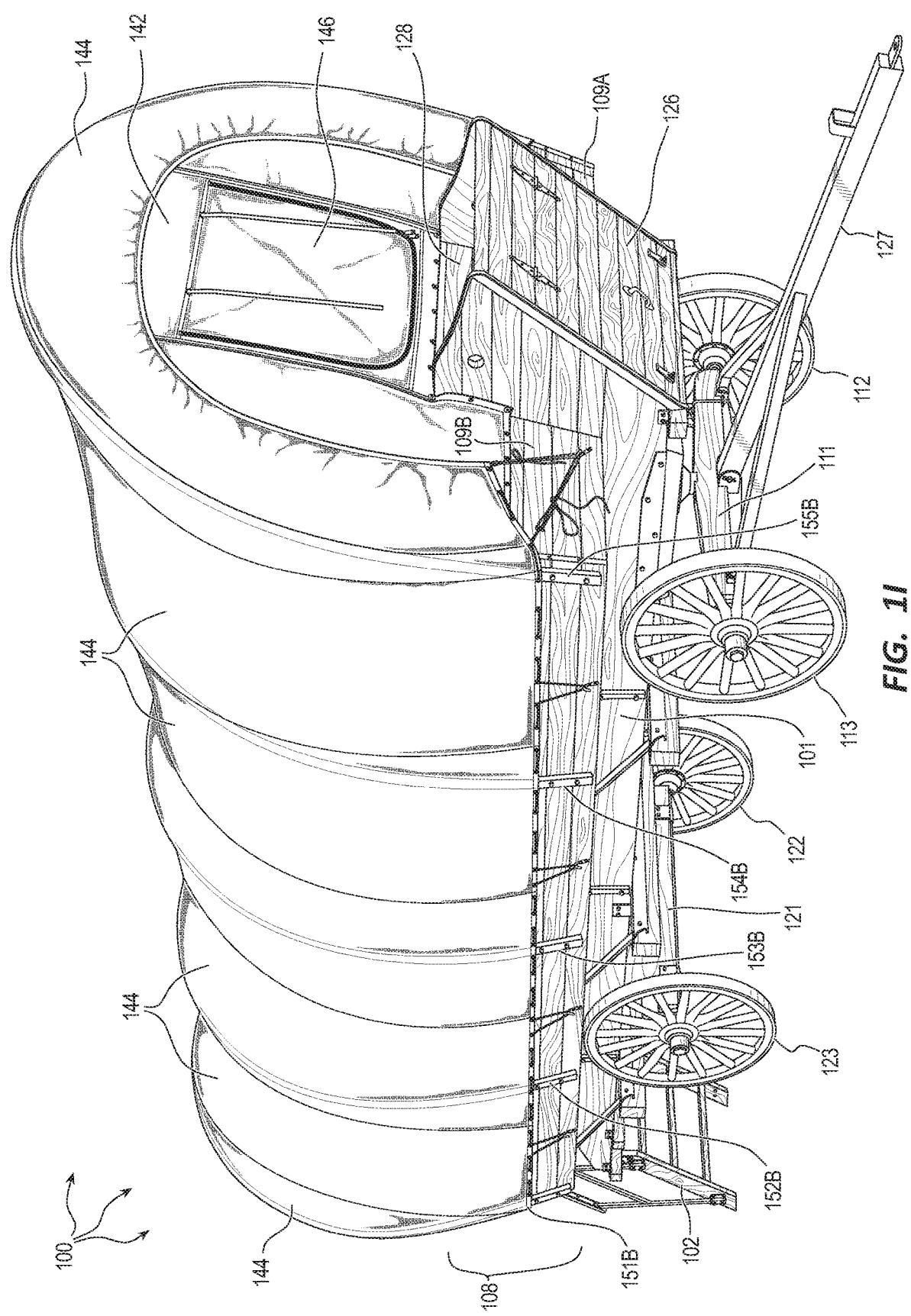
FIG. 1I illustrates an example view of the end of the wagon of FIG. 1G including an exterior canopy.

FIGS. 1H and 1I illustrate example views of ends of wagon 100 including an exterior canopy. As depicted, exterior canopy 144 is placed over exterior canopy frame supports 131E, 132E, 133E, 134E, and 135E. Exterior canopy 144 spans between exterior canopy frame supports 131E, 132E, 133E, 134E, and 135E and spans between side surface 107 and side surface 108. Exterior canopy 144 also partially covers front canopy 142 and rear canopy 141. Exterior canopy 144 can be secured to tie downs on side surface 107, side surface 108, front surfaces 109A and 109B, and rear surfaces 106A, and 106B. Exterior canopy 144 can be constructed of canvas. Canvas used to construct exterior canopy 144 can be designed for and/or treated to provide mold resistance or other properties that improve usability, reduce maintenance, or increase durability.

Using two canopies increases insulation in the cabin area relative to using a single canopy. Further, since exterior canopy frame supports 131E, 132E, 133E, 134E, and 135E are larger than corresponding interior canopy frame supports 131I, 132I, 133I, 134I, and 135I, air can flow between interior canopy 143 and exterior canopy 144. Air flow between interior canopy 143 and exterior canopy 144 in combination with increased insulation facilitates more effective climate control inside the cabin area.

In one aspect, wagon 100 includes a mini split air conditioning system. A compressor/condenser can be mounted to the underside of chassis 101. An air handler can be mounted somewhere within the cabin area. A conduit (possibly at least partially running in the utility channel between the longitudinal joists of the chassis 101) can connect the compressor/condenser and the air handling unit.

The cabin area can also include other infrastructure/amenities, such as, for example, a compostable toilet, running water, a septic tank, mains power, a lighting fixture, a sink, an electrical outlet, a radio, a television, a stove, a microwave, a wired network connectivity port, etc. In one aspect, wiring is run through one or more interior canopy frame supports (131I, 132I, 133I, 134I, or 135I) to lighting fixtures, power outlets, wired network connectivity ports, etc. In another aspect, wire or pipes needed to connect the various infrastructure/amenities are run through the utility channel of the chassis 101.

Figure 2A:
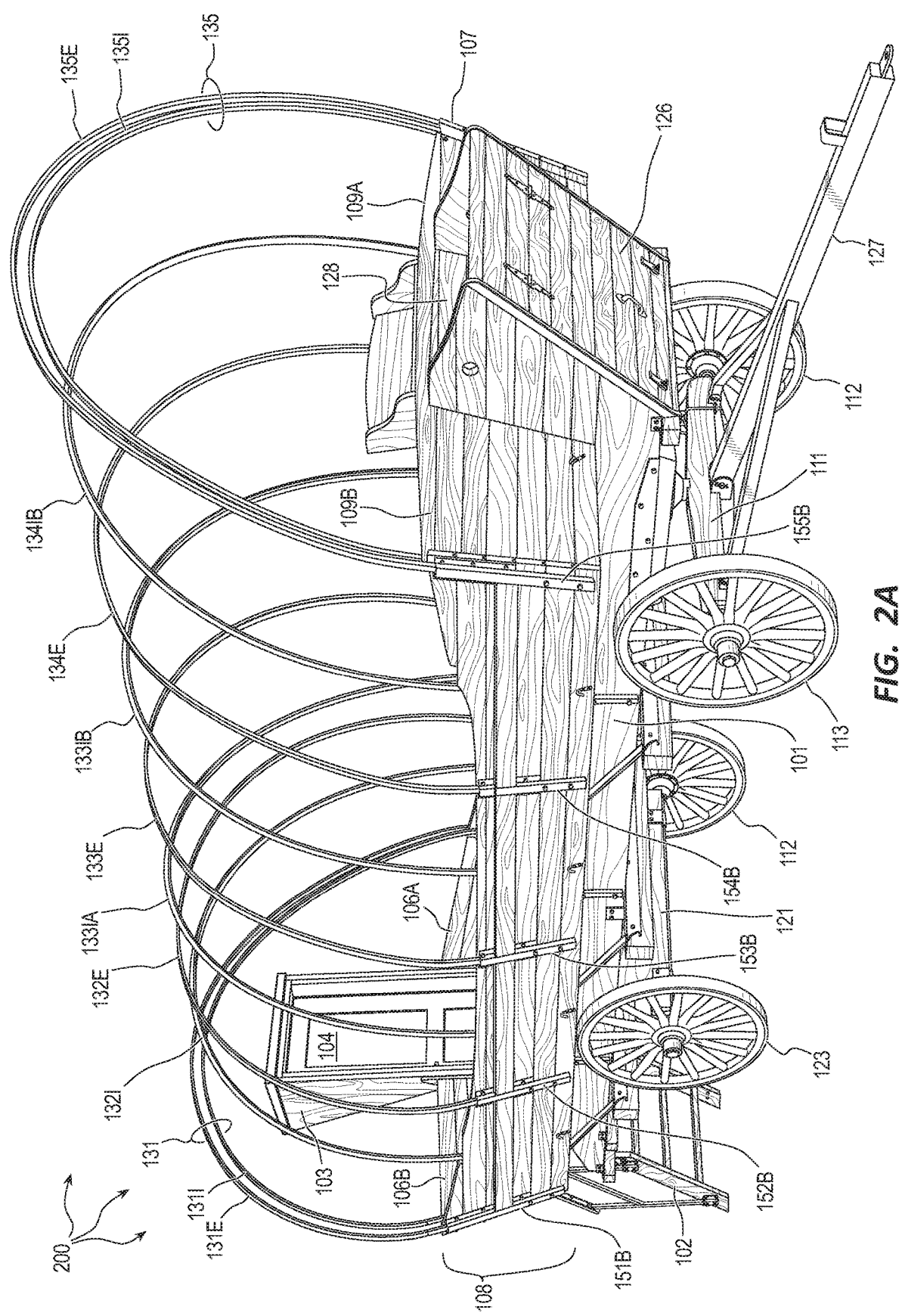
FIG. 2A illustrates an example view of the end of a wagon similar to the wagon of FIG. 1B and having interior canopy frame supports and exterior canopy frame supports offset from one another.

FIG. 2A illustrates an example view of the end of wagon 200. Wagon 200 is similar to wagon 100 and has interior canopy frame supports and exterior canopy frame supports offset from one another. In FIG. 2A, sleeves 201, 202, and 203 can be single sleeves attached to the exterior of side surface 108. Similar opposing sleeves corresponding to and aligned with sleeves 201, 202, and 203 can be single sleeves attached on the exterior of side surface 107. One end of exterior canopy frame support 132E can be inserted into sleeve 201 and another end of exterior canopy frame support 132E can be inserted into a corresponding opposing sleeve attached to the exterior of side surface 107. One end of exterior canopy frame support 133E can be inserted into sleeve 202 and another end of exterior canopy frame support 132E can be inserted into a corresponding opposing sleeve attached to the exterior of side surface 107. One end of exterior canopy frame support 134E can be inserted into sleeve 203 and another end of exterior canopy frame support 134E can be inserted into a corresponding opposing sleeve attached to the exterior of side surface 107.

As depicted, interior canopy frame support 211 is offset between canopy frame support pair 131 and exterior canopy frame support 132E. Interior canopy frame support 212 is offset between exterior canopy frame support 132E and exterior canopy frame support 133E. Interior canopy frame support 213 is offset between exterior canopy frame support 133E and exterior canopy frame support 134E. Interior canopy frame support 214 is offset between exterior canopy frame support 134E and canopy frame support pair 135.

Additional sleeves (not visible) can be attached to the interior of side surface 108 and can be attached to the interior of side surface 107. Interior attached sleeves on side surface 108 can correspond to and be aligned with opposing interior attached sleeves on side surface 107. One end of each of interior canopy frame supports 211, 212, 213, and 214 can be inserted into a sleeve attached to the interior of side surface 108. Another end of each of interior canopy frame supports 211, 212, 213, and 214 can be inserted into a corresponding opposing sleeve attached to the interior of side surface 107.

Canopy frame support pair 131 can be inserted into sleeves 151A and 151B as described. Similarly, canopy frame support pair 135 can be inserted into sleeves 155A and 155B as described.

In general, exterior canopy frame supports 131E, 132E, 133E, 134E, and 135E can be larger than interior canopy frame supports 131I, 211, 212, 213, 214, and 135I.

Similar to wagon 100, exterior canopy frame support 135E can be threaded through a front canopy 142. Likewise, exterior canopy frame support 131E can be threaded through rear 141. An interior canopy similar to internal canopy 143 can be placed over interior canopy frame supports 131I, 211, 212, 213, 214, and 135I (and under exterior canopy frame supports 131E, 132E, 133E, 134E, and 135E). The interior canopy can span between interior canopy frame supports 131I, 211, 212, 213, 214, and 135I and spans between side surface 107 and side surface 108. Thus, the interior canopy essentially creates a cabin area between: (1) side surface 107, (2) side surface 108, (3) rear surfaces 106A, 106B, and door frame 103, and (4) front surfaces 106A and 106B. The interior canopy can be constructed of canvas. Canvas used to construct the interior canopy can be designed for and/or treated to provide mold resistance or other properties that improve usability, reduce maintenance, or increase durability.

Exterior canopy 144 can be placed over exterior canopy frame supports 131E, 132E, 133E, 134E, and 135E. Exterior canopy 144 spans between exterior canopy supports 131E, 132E, 133E, 134E, and 135E and spans between side surface 107 and side surface 108. Exterior canopy 144 also partially covers front canopy 142 and rear canopy 141. Exterior canopy 144 can be secured to tie downs on side surface 107, side surface 108, front surfaces 109A and 109B, and rear surfaces 106A, and 106B. Exterior canopy 144 can be constructed of canvas. Canvas used to construct exterior canopy 144 can be designed for and/or treated to provide mold resistance or other properties that improve usability, reduce maintenance, or increase durability.

Using two canopies increases insulation in the cabin area relative to using a single canopy. Further, since exterior canopy frame supports 131E, 132E, 133E, 134E, and 135E are larger than corresponding interior canopy frame supports 131I, 211, 212, 213, 214, and 135I, air can flow between the interior canopy and exterior canopy 144. Air flow between the interior canopy and exterior canopy 144 in combination with increased insulation facilitates more effective climate control inside the cabin area.

Figure 2B:
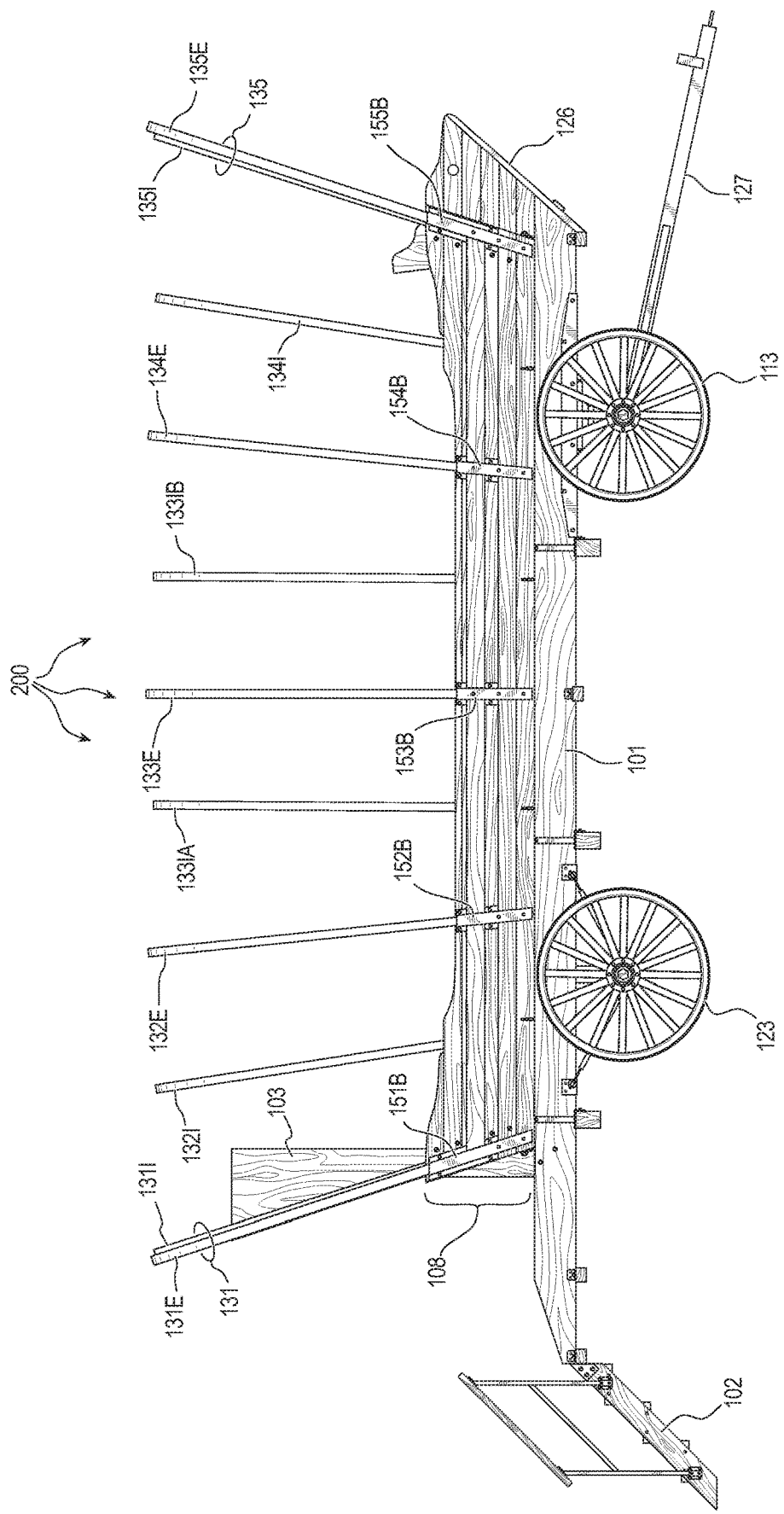
FIG. 2B illustrates a side view of the wagon of FIG. 2A.

FIG. 2B illustrates an example side view of wagon 200.

Wagon 200 can include any of described infrastructure/amenities, such as, for example, a mini split air conditioning system, conduit, a compostable toilet, running water, a septic tank, mains power, a lighting fixture, a sink, an electrical outlet, a radio, a television, a stove, a microwave, a wired network connectivity port, etc. In one aspect, wiring is run through one or more interior canopy frame supports (131I, 211, 212, 213, 214, or 135I) to lighting fixtures, power outlets, wired network connectivity ports, etc.

As depicted, wagon 200 includes six interior canopy frame supports while wagon 100 includes five interior canopy frame supports. Including an additional interior canopy frame support can facilitate better fitment of an internal canopy. In other aspects, a wagon includes an additional exterior canopy frame support. The additional exterior canopy frame support may be in addition to or in lieu of an additional interior canopy frame support. Other arrangements, patterns, numbers, and spacing of exterior canopy frame supports and interior canopy frame supports are also possible. For example, a wagon can include between 3 and 10 exterior canopy frame supports (and corresponding sleeves) and between 3 and 10 internal canopy frame supports (and corresponding sleeves).

Exterior canopy frame supports and interior canopy frame supports can be arranged as pairs and/or offset from one another. For example, two interior canopy frame supports may be included between each exterior canopy frame support (or vice versa). In one aspect, exterior canopy frame supports and interior canopy frame supports are arranged as pairs and additional interior canopy frame supports and/or additional exterior canopy frame supports are offset between the canopy frame support pairs.

The presently described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A wagon comprising:
   a chassis;
   one or more axles attached to a side of the chassis;
   one or more wheels attached to each of the one or more axles;
   a flooring surface attached to another side of the chassis;
   a first side surface attached to the flooring surface near a flooring surface edge;
   a second side surface attached to the flooring surface near another flooring surface edge opposing the flooring surface edge;
   a first canopy frame support pair, including:
      a first exterior canopy frame support attached to the first side surface and the second side surface and spanning between the first side surface and the second side surface;
      a first interior canopy frame support attached to the first side surface and the second side surface, spanning between the first side surface and the second side surface, and at least partially aligned under the first exterior canopy frame support; and
      wherein the first exterior canopy frame support is larger than the first interior canopy frame support leaving a gap between the first exterior canopy frame support and the first interior canopy frame support;
   a second canopy frame support pair, including:
      a second exterior canopy frame support attached to the first side surface and the second side surface and spanning between the first side surface and the second side surface;
      a second interior canopy frame support attached to the first side surface and the second side surface, spanning between the first side surface and the second side surface, and at least partially aligned under the second exterior canopy frame support; and
      wherein the second exterior canopy frame support is larger than the second interior canopy frame support leaving a gap between the second exterior canopy frame support and the second interior canopy frame support;
   a canopy resting on the exterior of the first exterior canopy frame support, resting on the exterior of the second exterior canopy frame support, spanning between the first exterior canopy frame support and the second exterior canopy frame support, and spanning between the first side surface and the second side surface; and
   another canopy resting on the exterior of the first interior canopy frame support, resting on the exterior of the second interior canopy frame support, spanning between the first interior canopy frame support and the second interior canopy frame support under the canopy, and spanning between the first side surface and the second side surface under the canopy.

2. The wagon of claim 1, wherein the first canopy frame support pair comprises an arched canopy frame support pair, wherein the first exterior canopy frame support comprises an arched exterior canopy frame support, and wherein the first interior canopy frame support comprises an arched interior canopy frame support.

3. The wagon of claim 1, wherein the chassis includes a first longitudinal joist and a second longitudinal joist; and further comprising a jockey box providing access to a channel between the first longitudinal joist and the second longitudinal joist.

4. The wagon of claim 1, wherein a first exterior canopy frame support attached to the first side surface and the second side surface comprises the first exterior canopy frame support inserted into a sleeve at the first side surface and inserted into another sleeve at the second side surface; and
   wherein a first interior canopy frame support attached to the first side surface and the second side surface comprises the first interior canopy frame support inserted into an additional sleeve at the first side surface and inserted into a further sleeve at the second side surface.

5. The wagon of claim 4, wherein the sleeve is mechanically connected to an exterior side of the first side surface and the other sleeve is mechanically connected to an exterior side of the second side surface; and wherein the additional sleeve is mechanically connected to an interior side of the first side surface and the further sleeve is mechanically connected to an interior side of the second side surface.

6. A wagon comprising:

a chassis;

one or more axles attached to one side of the chassis;

one or more wheels attached to each of the one or more axles;

a flooring surface attached to another side of the chassis;

a first side surface attached to the flooring surface near a flooring surface edge;

a second side surface attached to the flooring surface near another flooring surface edge opposing the flooring surface edge;

a first exterior canopy frame support attached to the first side surface and the second side surface and spanning between the first side surface and the second side surface;

a second exterior canopy frame support attached to the first side surface and the second side surface and spanning between the first side surface and the second side surface;

a interior canopy frame support offset between the first exterior canopy frame support and the second exterior canopy frame support, attached to the first side surface and the second side surface, and spanning between the first side surface and the second side surface;

wherein the interior canopy frame support is smaller than both the first exterior canopy frame support and the second exterior canopy frame support;

an exterior canopy resting on the exterior of the first exterior canopy frame support, resting on the exterior of the second exterior canopy frame support, spanning between the first exterior canopy frame support and the second exterior canopy frame support, and spanning between the first side surface and the second side surface; and an interior canopy resting on the exterior of the interior canopy frame support and spanning between the first side surface and the second side surface under the exterior canopy.

7. The wagon of claim 6, wherein a first exterior canopy frame support attached to the first side surface and the second side surface comprises the first exterior canopy frame support inserted into a sleeve at the first side surface and inserted into another sleeve at the second side surface; and wherein an interior canopy frame support attached to the first side surface and the second side surface comprises the interior canopy frame support inserted into an additional sleeve at the first side surface and inserted into a further sleeve at the second side surface.

8. The wagon of claim 7, wherein the sleeve is mechanically connected to an exterior side of the first side surface and the other sleeve is mechanically connected to an exterior side of the second side surface; and wherein the additional sleeve is mechanically connected to an interior side of the first side surface and the further sleeve is mechanically connected to an interior side of the second side surface.

9. A wagon comprising:

a chassis;

one or more axles attached to one side of the chassis;

one or more wheels attached to each of the one or more axles;

a flooring surface attached to another side of the chassis;

a first side surface attached to the flooring surface near a flooring surface edge;

a second side surface attached to the flooring surface near another flooring surface edge opposing the flooring surface edge;

a first interior canopy frame support attached to the first side surface and the second side surface and spanning between the first side surface and the second side surface;

a second interior canopy frame support attached to the first side surface and the second side surface and spanning between the first side surface and the second side surface;

an exterior canopy frame support offset between the first interior canopy frame support and the second interior canopy frame support, attached to the first side surface and the second side surface, and spanning between the first side surface and the second side surface;

wherein the exterior canopy frame support is larger than both the first interior canopy frame support and the second interior canopy frame support; and an interior canopy resting on the exterior of the first interior canopy frame support, resting on the exterior of the second interior canopy frame support, spanning between the first interior canopy frame support and the second interior canopy frame support, and spanning between the first side surface and the second side surface.

10. The wagon of claim 9, further comprising an exterior canopy resting on the exterior of the exterior canopy frame support and spanning between the first side surface and the second side surface over the interior canopy.

11. The wagon of claim 9, wherein an exterior canopy frame support attached to the first side surface and the second side surface comprises the exterior canopy frame support inserted into a sleeve at the first side surface and inserted into another sleeve at the second side surface; and wherein a first interior canopy frame support attached to the first side surface and the second side surface comprises the first interior canopy frame support inserted into an additional sleeve at the first side surface and inserted into a further sleeve at the second side surface.

12. The wagon of claim 11, wherein the sleeve is mechanically connected to an exterior side of the first side surface and the other sleeve is mechanically connected to an exterior side of the second side surface; and wherein the additional sleeve is mechanically connected to an interior side of the first side surface and the further sleeve is mechanically connected to an interior side of the second side surface.

* * * * *